(12) United States Patent
Fukui et al.

(10) Patent No.: US 8,083,357 B2
(45) Date of Patent: Dec. 27, 2011

(54) COOLING STRUCTURE OF PROJECTING APPARATUS

(75) Inventors: Masayuki Fukui, Yokohama (JP); Hideharu Saito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 12/213,912

(22) Filed: Jun. 26, 2008

(65) Prior Publication Data

US 2009/0040470 A1    Feb. 12, 2009

(30) Foreign Application Priority Data

Aug. 8, 2007   (JP) .................................. 2007-206493

(51) Int. Cl.
*G03B 21/26* (2006.01)

(52) U.S. Cl. .............. 353/58; 353/57; 353/61; 362/294; 362/373

(58) Field of Classification Search ............ 353/57, 353/58, 60–61, 98; 362/294, 373; 165/253
See application file for complete search history.

(56) References Cited

U.S. PATENT DOCUMENTS

| | | | |
|---|---|---|---|
| 7,210,825 B2 * | 5/2007 | Watanabe et al. | 362/373 |
| 2004/0233400 A1 * | 11/2004 | Kyoto et al. | 353/119 |
| 2005/0200816 A1 * | 9/2005 | Hsu | 353/57 |
| 2006/0066816 A1 | 3/2006 | Horiguchi et al. | |
| 2006/0092382 A1 * | 5/2006 | Kinoshita et al. | 353/54 |
| 2007/0046904 A1 | 3/2007 | Rudolph et al. | |
| 2007/0064198 A1 * | 3/2007 | Yoshimura | 353/20 |
| 2008/0231812 A1 * | 9/2008 | Sakai et al. | 353/58 |

FOREIGN PATENT DOCUMENTS

| | | |
|---|---|---|
| CN | 1755514 | 4/2006 |
| JP | 2003-157715 | 5/2003 |
| JP | 2005-24735 | 1/2005 |
| JP | 2006-293120 | 10/2006 |
| JP | 2007-41220 | 2/2007 |

* cited by examiner

*Primary Examiner* — Georgia Y Epps
*Assistant Examiner* — Kevin Wyatt
(74) *Attorney, Agent, or Firm* — Antonelli, Terry, Stout & Kraus, LLP.

(57) ABSTRACT

A projecting apparatus cooling structure is provided in which a discharge lamp can be always kept at an appropriate temperature whether the projecting apparatus is horizontally installed on a flat surface for forward projection or for downward projection or suspended from the ceiling for forward projection or for upward projection, so that the reliability and safety of the discharge lamp is improved and so that the life of the discharge lamp can be extended. The projecting apparatus projects an image for display using a discharge lamp as a light source. The projecting apparatus includes an air inlet for taking in a cooling medium for cooling the projecting apparatus, an air outlet for exhausting the cooling medium for cooling the projecting apparatus, a plurality of fans which each let the cooling medium flow in a predetermined direction, and a control section which detects a position in which the projecting apparatus is installed, and controls the plurality of fans according to the position detected by the position sensor.

8 Claims, 11 Drawing Sheets

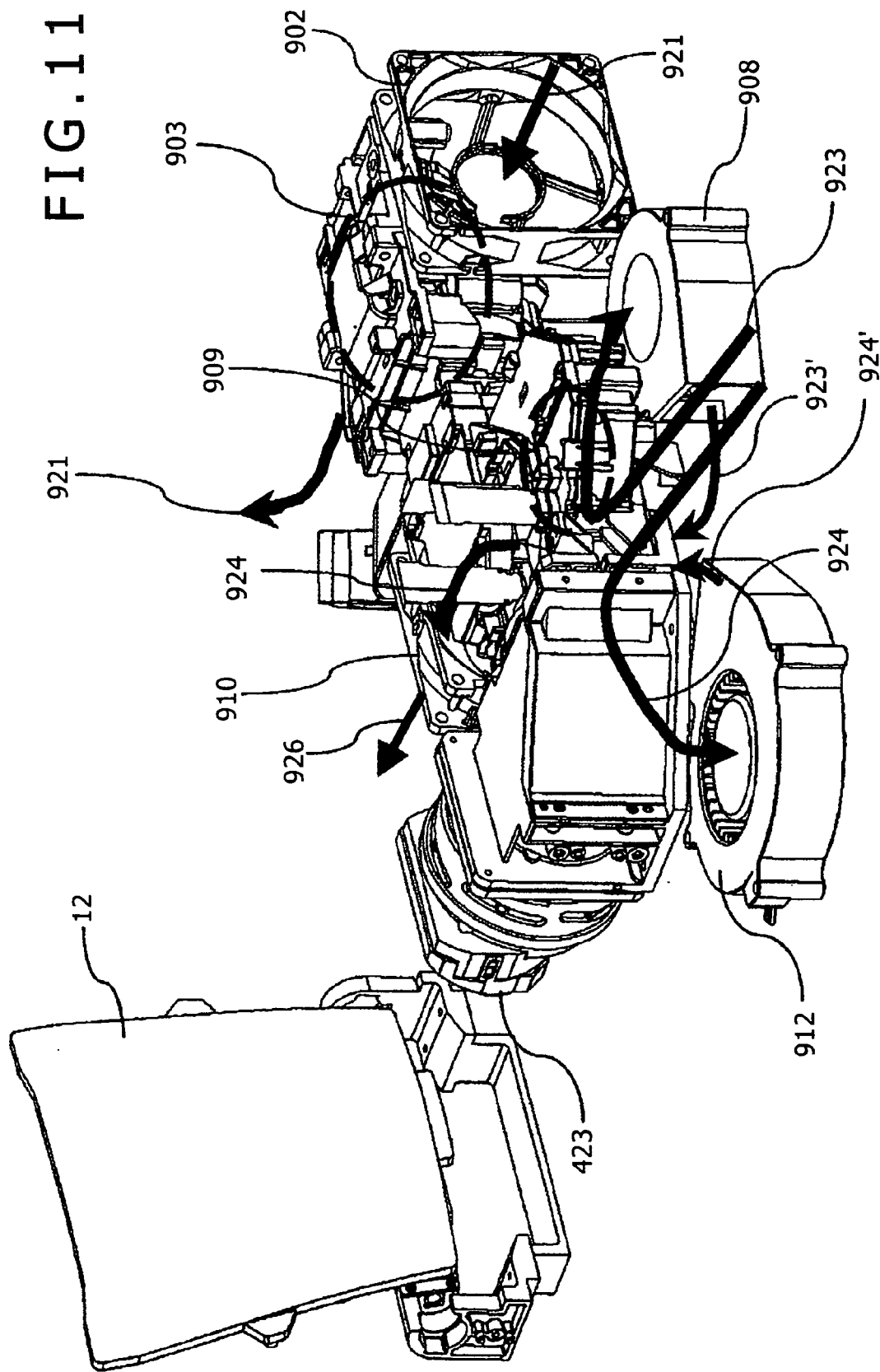

COOLING STRUCTURE OF PROJECTING APPARATUS

BACKGROUND OF THE INVENTION (1) Field of the Invention

The present invention relates to a projecting apparatus which projects an image for display using a discharge lamp as a light source and, more particularly, to a cooling structure of a projecting apparatus suitable for cooling heat sources including a light source unit.

(2) Description of the Related Arts

A projecting apparatus forms an optical image by modulating, according to a video signal, an optical beam received from a light source using a display device, for example, a liquid crystal panel and projects the optical image thus formed on a projection surface such as an external screen or wall surface using a projection lens or projection mirror.

Generally, such a projecting apparatus includes, as a light source, a discharge lamp (lamp bulb), for example, an extra-high pressure mercury lamp or metal halide lamp of a short arc type (for example, with an arc length of up to 1.5 mm) which can be regarded as a point light source containing a high-pressure (about 15 MPa or more) light-emitting gas.

Such a discharge lamp has a rear portion covered with a reflector and a front portion covered with an optically transmissive explosion-proof glass for preventing, in the event of explosion of the discharge lamp, fractions of the discharge lamp from frying off, and makes up a light source unit (also referred to as a lamp unit) having an almost sealed structure. While the discharge lamp is lit, therefore, its temperature rises lowering its reliability and shortening its life. As a means of lowering the temperature of a discharge lamp, forced air cooling made using fans is considered effective. When a projecting apparatus is operated, a portion above the discharge lamp is likely to become the hottest part of the projecting apparatus. Under such circumstances, cooling systems designed to intensively cool a portion above the discharge lamp so as to keep the discharge lamp at appropriate temperature have been proposed.

The appropriate temperature of a discharge lamp depends on the type, manufacturer, and specifications of the discharge lamp. Generally, however, the difference in temperature between portions above and below a discharge lamp is preferred to be smaller with a temperature difference exceeding 150° C. considered unallowable.

Using a discharge lamp which is not kept at an appropriate temperature for extended periods of time shortens the life of the discharge lamp, for example, by causing the discharge lamp to explode or to be disabled before a normal length of its life expires.

Existing projecting apparatuses are generally classified into those of a surface installation type which are horizontally installed on a flat surface, for example, on the top of a desk and those of a suspended installation type which are suspended, for example, from the ceiling. Recent models of projecting apparatuses include many which are convertible between surface installation and suspended installation.

In many cases, a projecting apparatus to be horizontally installed on the top of a desk is set to output a projection beam diagonally upwardly so that the beam can project an image on a projection surface, for example an external screen or wall surface located upwardly forward of the desk. When such a projecting apparatus set to output a projection beam diagonally upwardly is suspended from the ceiling as it is, it is caused to project an image on the ceiling. To enable such a projecting apparatus to downwardly project an image, it is necessary to suspend the projecting apparatus upside down. Installing the projecting apparatus upside down positions the light source unit included in the projecting apparatus also upside down. A projecting apparatus which may be installed upside down as required is required to have a cooling structure in which the discharge lamp included in the projecting apparatus can be kept at an appropriate temperature whether or not the projecting apparatus is installed upside down. Furthermore, whether or not the projecting apparatus is installed upside down, the discharge lamp requires, due to its characteristics, that its optical axis be kept horizontal relative to the ground.

A light source unit for a projecting apparatus in which a discharge lamp is forcedly air-cooled whether or not the projecting apparatus is installed upside down is disclosed in Japanese Patent Application Laid-Open Publication No. 2005-24735. To allow the discharge lamp to be kept at an appropriate temperature even when the projecting apparatus is installed upside down, the light source unit is provided with two cooling air inlets, one in an upper side of a reflection mirror included in the light source unit and the other in a lower side of the reflection mirror. The two cooling air inlets are communicated to corresponding cooling air outlets via a pair of cooling air passages fixedly provided in the housing of the light source unit. The two cooling air inlets are provided with one shutter which moves, by its own weight, toward the upper or lower side of the reflection mirror. Depending on whether the projecting apparatus is installed on a flat surface in a normal position or suspended from the ceiling upside down, the shutter moving automatically by its own weight closes either one of the two cooling air inlets allowing the cooling air to be let out only from the corresponding one of the cooling air outlets provided in the upper and lower sides of the reflection mirror, respectively. Thus, the light source unit is designed to allow the portions above and below the discharge lamp to be cooled under unchanged conditions whether the projecting apparatus is installed on a flat surface or suspended from the ceiling so as to always keep the discharge lamp at an appropriate temperature.

To realize, using the above technique, a projecting apparatus which can extend the life of its light source without reducing the reliability and safety of the light source whether the projecting apparatus is installed on a flat surface or suspended from the ceiling, keeping the discharge lamp (lamp bulb) of the projecting apparatus at an appropriate temperature is important.

Recently, it has been increasingly required that projecting apparatuses can be installed in diversified positions as required according to applications. For example, it is recently required that projecting apparatuses, besides being installable on a flat horizontal surface or suspendable from the ceiling as described above, can also be installed differently to upwardly or downwardly project an image.

When a projecting apparatus is horizontally installed on a flat surface or suspended from the ceiling as described above, it is considered possible to keep the discharge lamp of the projecting apparatus at an appropriate temperature using the cooling system proposed in Japanese Patent Application Laid-Open Publication No. 2005-24735. When the projecting apparatus is installed differently than as described above so as to project an image upwardly or downwardly, the cooling system proposed in Japanese Patent Application Laid-Open Publication No. 2005-24735 cannot keep the discharge lamp at an appropriate temperature, so that the life of the discharge lamp may be shortened detracting from the reliability and safety of the discharge lamp.

The cooling system proposed in Japanese Patent Application Laid-Open Publication No. 2005-24735 requires openings provided in a neck portion of the reflector, but such openings cannot always be provided depending on the specifications of the lamp to be used. Thus, there may be cases where the reflector cannot be shaped as described in Japanese Patent Application Laid-Open Publication No. 2005-24735.

An object of the present invention is to provide, so as to solve the above problems, a projecting apparatus including a light source unit which, having a reflector with no opening in its neck portion, is simply configured and which has a cooling structure capable of keeping a discharge lamp (lamp bulb) at an appropriate temperature to extend the life of the light source whether the projecting apparatus is installed on a flat surface or suspended from the ceiling as described above or installed otherwise for upward or downward projection.

SUMMARY OF THE INVENTION

To achieve the above object, the projecting apparatus according to the present invention projects an image for display using a discharge lamp as a light source and includes: an air inlet for taking in a cooling medium for cooling the projecting apparatus, an air outlet for exhausting the cooling medium for cooling the projecting apparatus, a plurality of fans which each let the cooling medium flow in a predetermined direction, a posture sensor which detects a position in which the projecting apparatus is installed, and a control section which controls the plurality of fans according to the position detected by the posture sensor.

The projecting apparatus preferably has a lamp duct which is provided on a side of the projecting apparatus, the side being close to a lamp door section provided for use in replacing the discharge lamp, and which allows the cooling medium to cool, after cooling the discharge lamp, a lamp reflector disposed rearward of the discharge lamp.

In the projecting apparatus, the control section preferably controls, according to the position detected by the posture sensor, the plurality of fans such that torques of some of the plurality of fans are not so high as to generate a negative pressure.

According to the present invention, a discharge lamp included in a projecting apparatus can be always kept at an appropriate temperature whether the projecting apparatus is installed on a flat surface or suspended from the ceiling as described above or installed otherwise for upward or downward projection. Therefore, the reliability and safety of the discharge lamp can be improved and the life of the discharge lamp can be extended.

BRIEF DESCRIPTION OF THE DRAWINGS

FIG. 11 is an explanatory diagram showing an embodiment which cooling air flows passing through the projecting apparatus according to the embodiment of the invention.

DETAILED DESCRIPTION OF THE PREFERRED EMBODIMENT

Figure 1A:
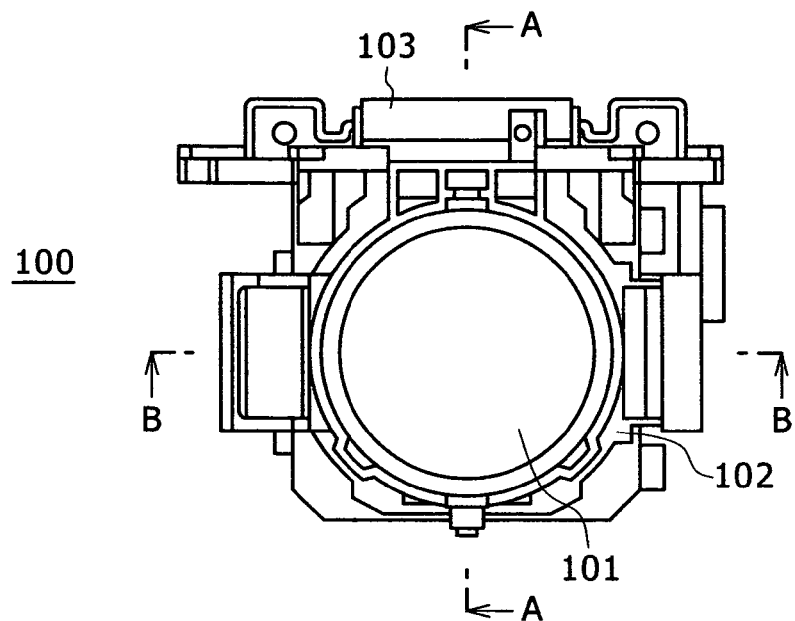
FIGS. 1A and 1B are explanatory diagrams showing a light source unit according to an embodiment of the invention.

An embodiment of the present invention will be described below in detail with reference to the attached drawings. In the attached drawings, parts having identical functions are allocated identical reference numerals to avoid duplicated descriptions.

FIGS. 1A and 1B to FIGS. 3A and 3B show a light source unit of a projecting apparatus according to an embodiment of the invention.

Figure 1B:
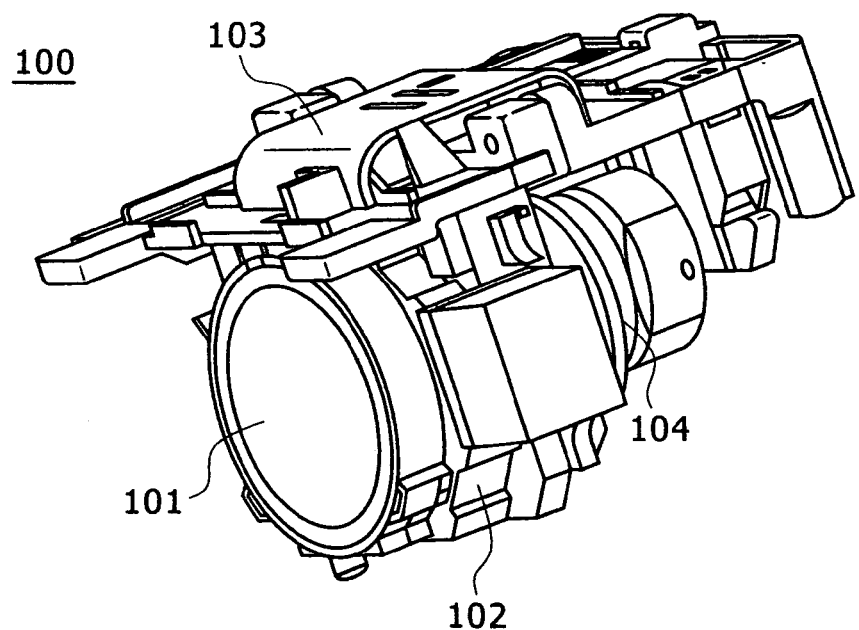

FIG. 1A is a front view of a light source unit 100 to be mounted in the projecting apparatus, and FIG. 1B is a perspective view of the light source unit as seen from diagonally above.

Figure 2A:
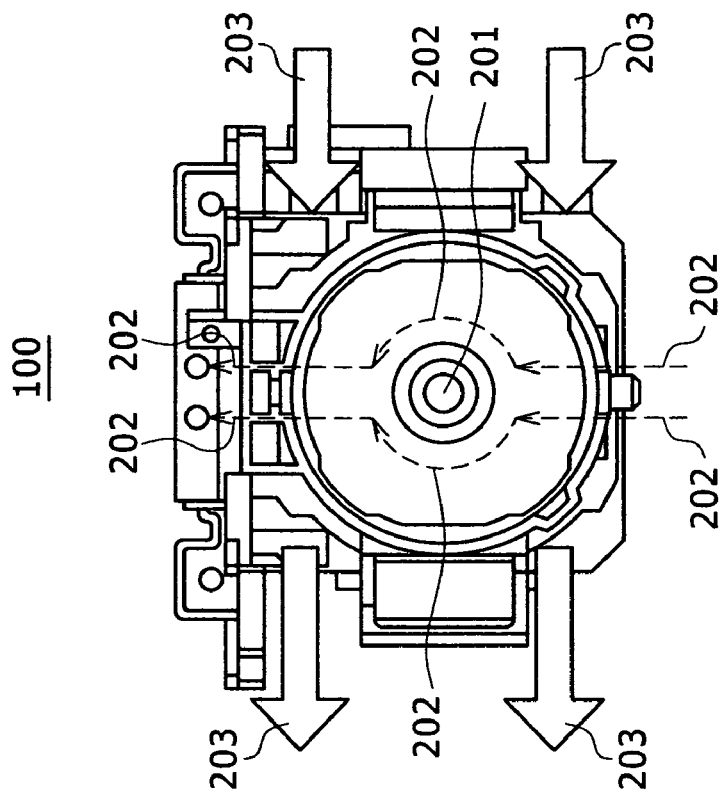
FIGS. 2A and 2B are explanatory cross-sectional diagrams showing the light source unit.
Figure 2B:
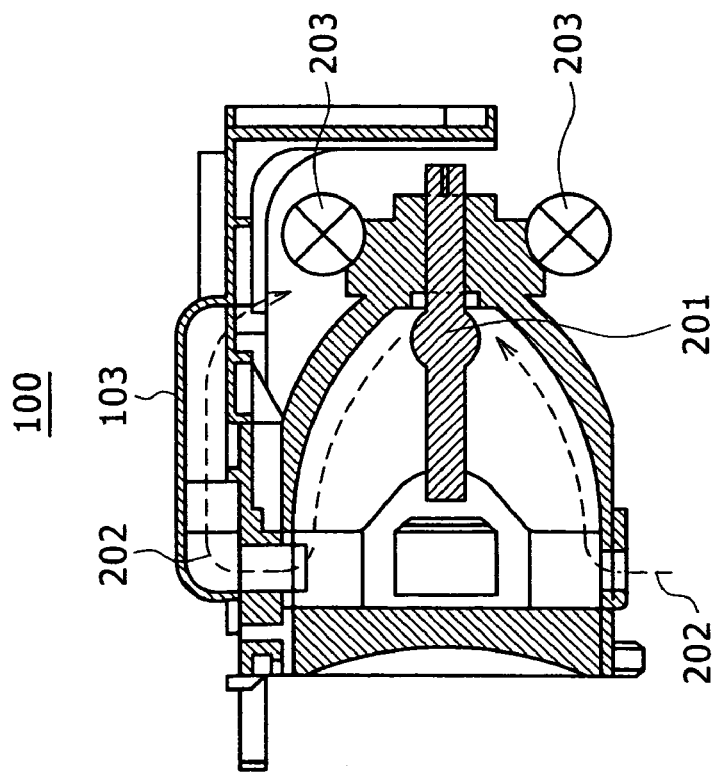

FIG. 2A is a schematic diagram showing a cross-sectional view taken along line A-A in FIG. 1A, and FIG. 2B is a diagram schematically showing cooling air 202 and 203 flowing, after passing a lamp lens 101 of the light source unit 100, inside and outside the lamp case 102.

Figure 3A:
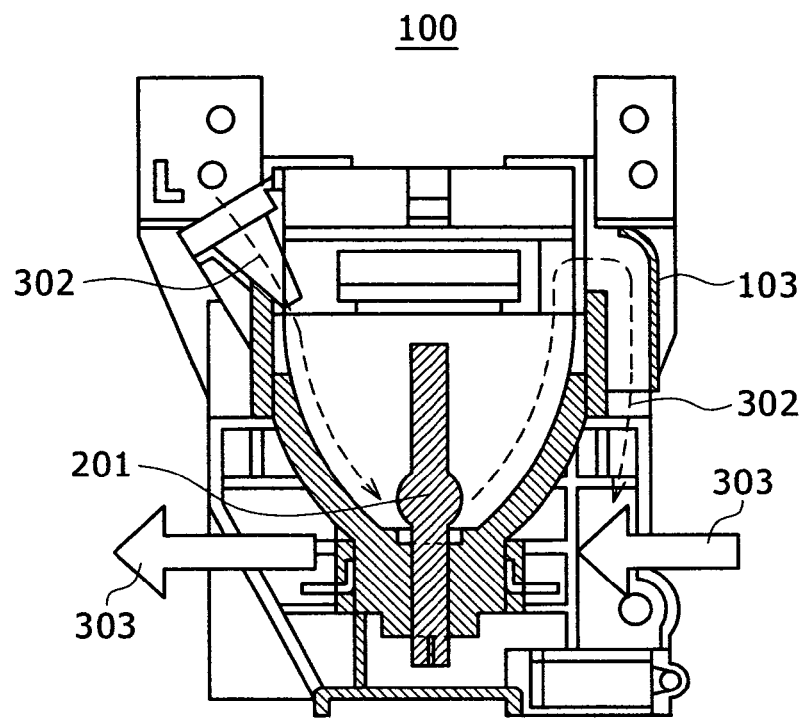
FIGS. 3A and 3B are explanatory cross-sectional diagrams showing the light source unit.
Figure 3B:
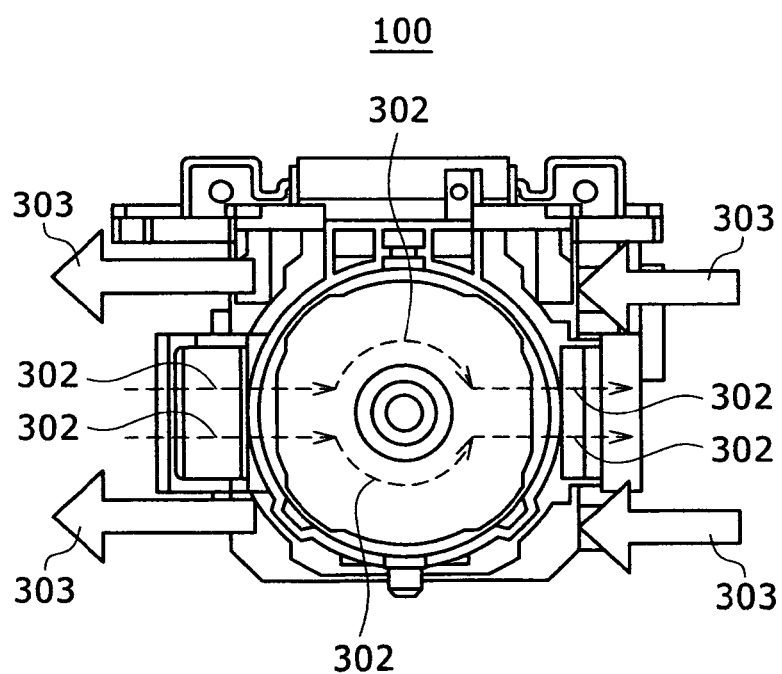

FIG. 3A is a schematic diagram showing a cross-sectional view taken along line B-B in FIG. 1A, and FIG. 3B is a diagram schematically showing cooling air 302 and 303 flowing, after passing the lamp lens 101 of the light source unit 100, inside and outside the lamp case 102.

In FIGS. 1A and 1B, reference numeral 101 denotes the lamp lens; reference numeral 102, the lamp case; reference numeral 103, a lamp duct; and reference numeral 104, a lamp reflector. The light source unit 100 includes a lamp bulb (discharge lamp) 201 (see FIGS. 2A and 2B, or FIG. 3A) and the lamp case 102 that includes the lamp reflector 104 disposed to cover the lamp bulb 201 from behind and the transmissive lamp lens 101 disposed forward, on the opening side, of the lamp reflector 104.

FIGS. 2A and 2B show how cooling air flows in the light source unit 100 when the projecting apparatus is vertically installed on a flat surface (desktop installation for downward projection) (see FIG. 6C being described later).

In FIGS. 2A and 2B, reference numeral 201 denotes the lamp bulb; reference numeral 202, the cooling air flowing (as indicated by black broken-line arrows) in the lamp case 102 to cool the lamp bulb 201; and reference numeral 203, cooling air to cool the lamp reflector 104. The cooling air 203 shown in FIG. 2A flows, as indicated by blank arrows in FIG. 2B, in the depth direction of FIG. 2A.

The cooling air 202 having cooled the lamp bulb 201 flows through the lamp duct 103 subsequently joining the cooling air 203 that cools the lamp reflector 104.

In the above cooling arrangement, the heat generated in the light source unit 100 is not directly transmitted to the lamp door (see a lamp door 23 of a projecting apparatus 10, being described later, shown in FIG. 5), so that the temperature of the lamp door section does not easily rise.

FIGS. 3A and 3B show how cooling air flows in the light source unit 100 when the projecting apparatus is horizontally installed on a flat surface or horizontally suspended from the ceiling (see FIG. 6A or 6B being described later).

In FIGS. 3A and 3B, reference numeral 201 denotes the lamp bulb; reference numeral 302, the cooling air flowing (as indicated by black broken-line arrows) in the lamp case 102 to cool the lamp bulb 201; and reference numeral 303, the cooling air flowing (as indicated by blank arrows) to cool the lamp reflector 104.

Referring to FIG. 3A, the cooling air 302 having cooled the lamp bulb 201 flows through the lamp duct 103 subsequently joining the cooling air 303 that cools the lamp reflector 104.

In the above cooling arrangement, the heat generated in the light source unit 100 is not directly transmitted to the lamp door (see the lamp door 23 of the projecting apparatus 10, being described later, shown in FIG. 5), so that the temperature of the lamp door section does not easily rise.

The temperature of the lamp reflector 104 reaches as high as about 250 degrees Celsius even with the lamp bulb 201 kept being cooled while it is lit. The lamp bulb 201 to be used in the projecting apparatus may be an extra-high pressure mercury lamp, metal halide lamp, or xenon lamp of a short arc type (for example, with an arc length of 0.5 mm to 1.5 mm). In the present embodiment, an extra-high pressure mercury lamp (with an arc length of about 1.2 mm) requiring an input power of 285 W is used as the lamp bulb 201, but it may be replaced by a different type of lamp.

The lamp bulb 201 is disposed in a space surrounded by the lamp reflector 104, lamp case 102, and lamp lens 101 and consumes a large amount of power, so that its temperature becomes very high, for example, as high as 1,050 degrees Celsius. In the present embodiment, to cope with such a high temperature of the lamp bulb 201, a cooling fan is used to blow cooling air (the cooling air 203 shown in FIGS. 2A and 2B or the cooling air 303 shown in FIGS. 3A and 3B) to the outer surface of the lamp reflector 104. Cooling air (the cooling air 202 shown in FIGS. 2A and 2B or the cooling air 302 shown in FIGS. 3A and 302) is also introduced into the space where the lamp bulb 201 is disposed.

The lamp case 102 is provided, on a side, with an opening 202a through which the cooling air flows in and, on the opposite side, an opening 202b through which the cooling air flows out. Namely, the cooling air flowing in through the opening 202a flows out, after cooling the lamp bulb 201, through the opening 202b.

Each of the openings 202a and 202b is formed like a mesh or, alternatively, covered with a wire cloth to prevent, should the lamp bulb 201 be broken, fragments of the lamp bulb 201 from flying outward through the opening. The lamp case 102 may be provided with more than one each of the openings 202a and 202b.

Figure 4:
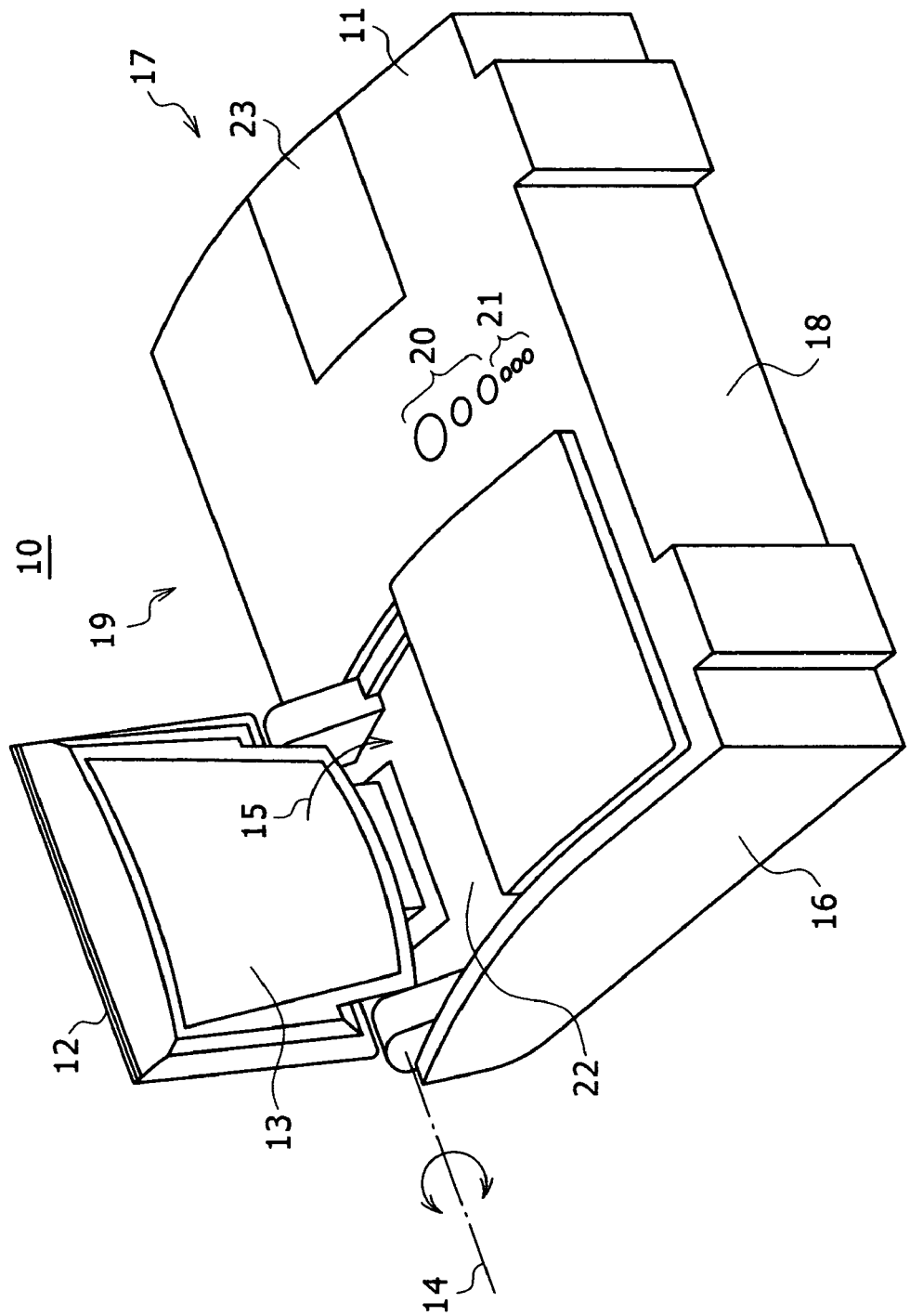
FIG. 4 is a diagram showing a projecting apparatus according to the embodiment of the invention.

FIG. 4 shows an appearance of the projecting apparatus according to the present embodiment of the invention. In FIG. 4, reference numeral 10 denotes the projecting apparatus; reference numeral 11, a housing; reference numeral 12, a projection mirror; reference numeral 13, a reflecting surface forming a free curved surface of the projection mirror 12; reference numeral 14, a rotary axis, represented by a dashed line, about which the projection mirror 12 turns when it is closed or opened; reference numeral 15, a direction, represented by an arrow, along which the projection mirror 12 is closed to be put in the housing 11; reference numeral 16, a side panel section provided with connectors (not shown) to which a power supply, video signal, and control signals are connected of the housing 11; reference numeral 17, a side exhaust section which is provided in a side portion opposite to the side panel section 16 of the housing 11 and which includes a cooling medium outlet; reference numeral 18, an intake section provided with cooling medium inlets; reference numeral 19, a rear exhaust section opposite to the intake section 18; reference numeral 20, operation buttons; reference numeral 21, indicators; reference numeral 22, an opening; and reference numeral 23, a lamp door. In FIG. 4, details of the surfaces of the panel section 16, intake section 18, opening 22, and other parts of the projecting apparatus 10 are not shown. Though not shown, the panel section 16 is provided with plural connectors. Similarly, the intake section 18 is provided with plural holes as cooling medium inlets through which, for example, air is sucked in and projecting parts designed to allow cooling air to be sucked in even when the projecting apparatus 10 is positioned on the intake section 18. The rear exhaust section 19 is also provided with a carrying handle which can be put in the housing 11. The indicators 21 includes, for example LEDs (light emitting diodes).

Referring to FIG. 4, the housing 11 accommodates a mirror drive motor, not shown. The mirror drive motor, by running under the control of a control section, being described later, turns the projection mirror 12 via a rotation transmission mechanism to open or close the opening 22 of the housing 11.

In the state shown by FIG. 4, the projecting apparatus 10 is in operation with the projection mirror 12 open and fixed in its operating position. Image projection light generated in an image display section and outputted from an image projection light output opening in the housing 11 is reflected by the free curved reflecting surface 13 of the projection mirror 12 fixed at a regular operating angle (in a regular operating position) and projected on a projection surface, for example, an external screen.

The lamp door 23 is used to provide an opening through which the light source unit 100, shown in FIGS. 1A and 1B, of the invention is inserted in the projecting apparatus 10. FIG. 4 shows the projecting apparatus 10 horizontally installed on the top of a desk. The light source unit 100 is installed in the projecting apparatus 10 in the orientation as shown in FIG. 1B and FIG. 5.

Figure 5:
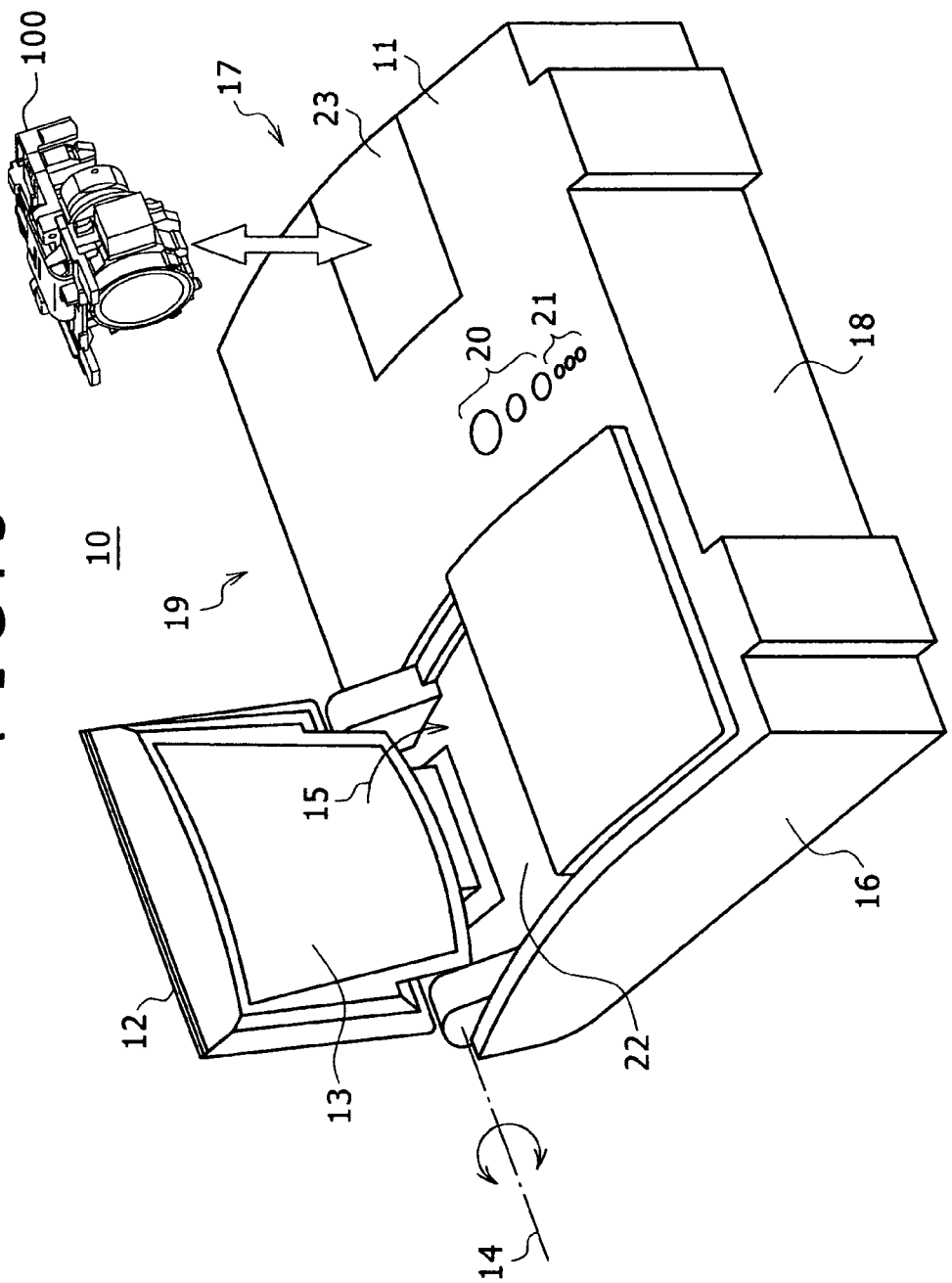
FIG. 5 is a diagram showing the projecting apparatus according to the embodiment of the invention.

As known from FIG. 5 schematically showing the orientation in which the light source unit 100 is installed in the projecting apparatus 10, the light source unit 100 is installed such that the lamp door 23 and the top portion of the light source unit 100 face each other in proximity to each other. With the lamp duct 103 (see FIG. 2A) provided in the top portion (top side to be positioned toward the lamp door 23) of the light source unit 100, however, the heat generated by the light source unit 100 or lamp bulb 201 is transmitted by the cooling air toward the lamp reflector 104 without being directly transmitted to the lamp door 23. The user can therefore touch, for example, when replacing the light bulb 201, the top surface of the projecting apparatus 10 or the lamp door 23 without suffering a burn.

FIGS. 6A to 6D show different installation modes of the projecting apparatus of the invention.

Figure 6A:
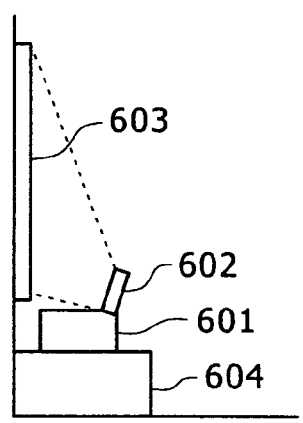
FIGS. 6A to 6D are diagrams showing different installation modes of the projecting apparatus according to the embodiment of the invention.

FIG. 6A shows a surface installation mode for forward projection in which a projecting apparatus 601 including a projection mirror 602 is installed on a table 604 and the projection mirror 602 forwardly projects an image, as shown by broken lines, on a vertical projection surface 603.

Figure 6B:
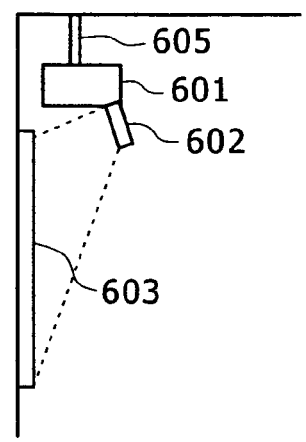

FIG. 6B shows a suspended installation mode for forward projection in which the projecting apparatus 601 is suspended from the ceiling using a suspension pole 605 and the projection mirror 602 forwardly projects an image, as shown by broken lines, on a vertical projection surface 603.

Figure 6C:
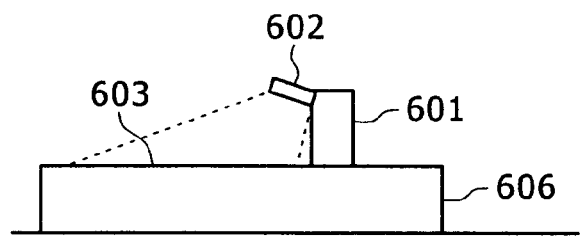

FIG. 6C shows a surface installation mode for downward projection (desktop installation for downward projection) in which the projecting apparatus 601 is installed on a table or desk 606 serving also as a projection surface 603 and the projection mirror 602 downwardly projects an image, as shown by broken lines, on the horizontal projection surface 603. In this installation mode, the projecting apparatus 601 and the projection surface 603 need not necessarily be on a same table or desk.

Figure 6D:
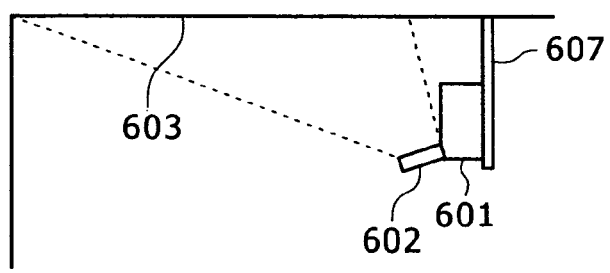

FIG. 6D shows a suspended installation mode for upward projection in which the projecting apparatus 601 is suspended from the ceiling using a suspension pole 607 and the projection mirror 602 upwardly projects an image, as shown by broken lines, on a horizontal projection surface 603.

Figure 7:
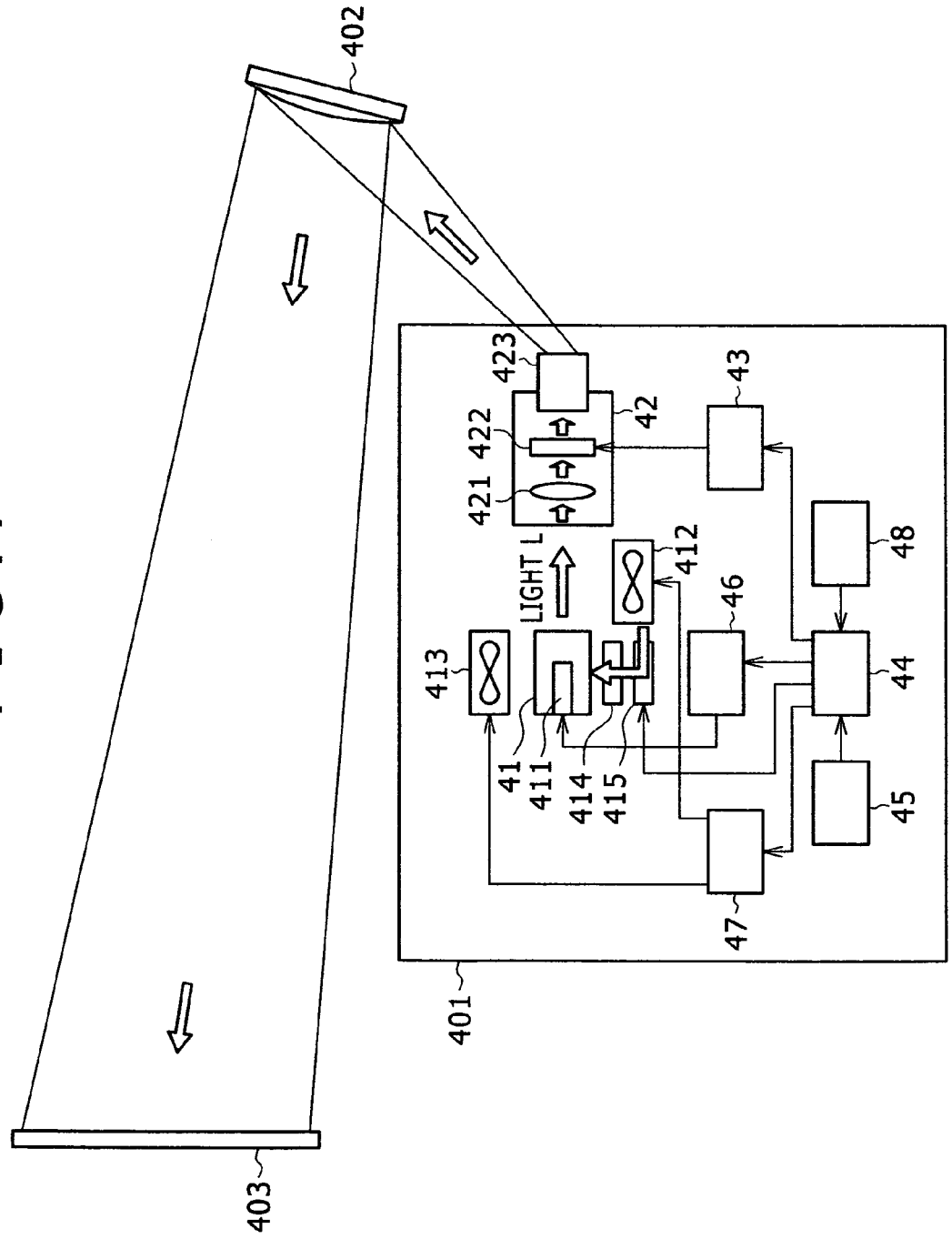
FIG. 7 is a block diagram outlining an embodiment configuration of the projecting apparatus according to the embodiment of the invention.

FIG. 7 is a block diagram outlining an example configuration of the projecting apparatus of the invention.

Referring to FIG. 7, the projecting apparatus includes a housing 401 and a projection mirror 402. Light L from a light source section 41 enters an optical unit 42. The optical unit 42 includes an illumination optical system 421, a display panel 422 configured with, for example, a liquid crystal panel, and an output lens 423. The illumination optical system 421 uniformizes the intensity distribution of the light L from a lamp bulb 411 and emits the uniformized light L to the display panel 422. The display panel 422 that is driven by a display drive circuit 43 forms, by modulating the light L according to an optical image (not shown) given by a video signal, image projection light. The image projection light thus formed is outputted through an image projection light output opening provided for the output lens 423 and projected, via the projection mirror 402, on a projection surface 403, which may be, for example, an external screen or a wall surface.

It must be noted that the light outputted from the image projection light output opening provided for the output lens 423, the projection mirror 402, the output light reflected by the projection mirror 402, and the projection surface 403 are only schematically illustrated in FIG. 7 and that FIG. 7 does not accurately represent the above configuration and arrangement as to, for example, installation angles, part sizes, and directions of optical transmission.

The projecting apparatus is controlled by a control section 44 (hereinafter referred to as the "microcomputer") including a CPU (Central Processing Unit) which operates according to a program stored, for example, in a ROM (Read Only Memory). The microcomputer 44 performs processing corresponding to the button operation performed by the user at an operation section 45. For example, it turns the discharge lamp (lamp bulb) 411 included in the light source section 41 on and off via a light source power supply circuit 46, and operates or stops, via a fan power supply circuit 47 and responding to the turning on and off of the discharge lamp 411, fans provided for the light source section 41, i.e. a fan 412 for internal cooling and a fan 413 for outside surface cooling, a duct 414, and a shutter 415 for air volume adjustment. The microcomputer 44 also displays an image by controlling the display drive circuit 43. The microcomputer 44 receives, from a posture sensor 48, information on the position of the projecting apparatus and, based on the received position information, determines which one of the following installation modes the projecting apparatus has been installed in: surface installation mode for forward projection (FIG. 6A), suspended installation mode for forward projection (FIG. 6B), surface installation mode for downward projection (FIG. 6C), and suspended installation mode for upward projection (FIG. 6D).

Figure 8:
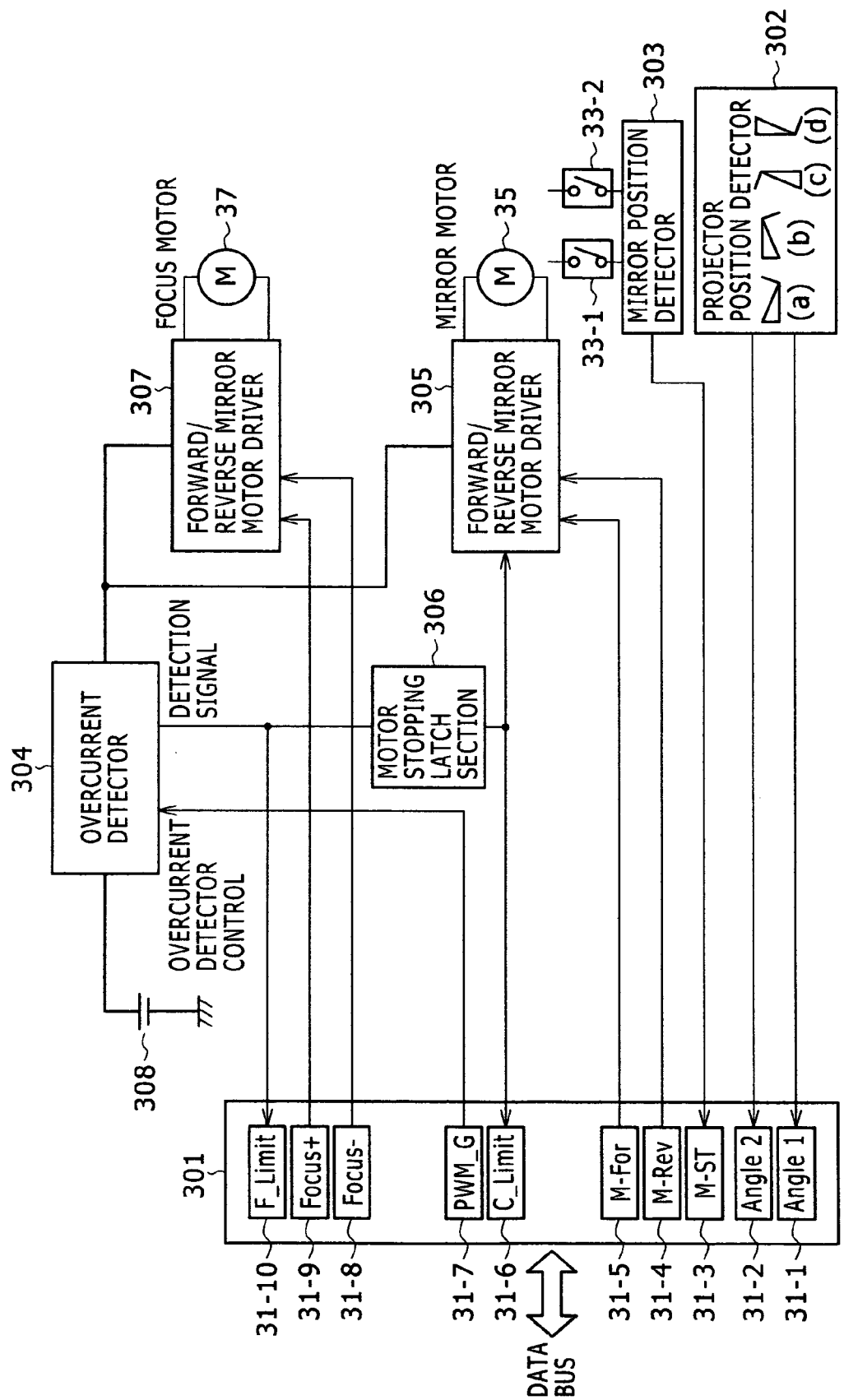
FIG. 8 is a diagram partly showing an embodiment of a control circuit of the projecting apparatus according to the embodiment of the invention.

An example method in which the mode of installation of the projecting apparatus according to the invention is detected will be described with reference to FIG. 8. FIG. 8 partly shows an example of a control circuit of the projecting apparatus of the invention. The portion shown in FIG. 8 of the control circuit mainly performs projection mirror rotation control and autofocus control. In FIG. 8, reference numeral 301 denotes a control section; reference numeral 302, a posture sensor; reference numeral 303, a mirror state detecting section; reference numeral 304, an overcurrent detecting section; reference numeral 305, a mirror motor driver; reference numeral 306, a motor stopping latch section; reference numeral 307, a focus motor driver; and reference numeral 308, a motor power supply. Also, in FIG. 8, reference numerals 31-1 to 31-10 denote constituent parts of the control section 301, respectively. Namely, reference numeral 31-1 denotes a installation mode (i) detecting section (Angle 1); reference numeral 31-2, a installation mode (ii) detecting section (Angle 2); reference numeral 31-3, a mirror state control section (M-ST); reference numeral 31-4, a mirror reverse rotation control section (M-Rev); reference numeral 31-5, a mirror forward rotation control section (M-For); reference numeral 31-6, a motor state detecting section (C_Limit); reference numeral 31-7, an overcurrent detection control section (PWM-G); reference numeral 31-8, a focus reverse control section (Focus−), reference numeral 31-9, a focus forward control section (Focus+); reference numeral 31-10, a focus state detecting section (F_Limit); reference numeral 33-1, a limiter switch which detects a closed state of the projection mirror 12 (the limiter switch turns on upon detecting the state); reference numeral 33-2, a limiter switch which detects an open state of the projection mirror 12 (the limiter switch turns on upon detecting the state); reference numeral 35, a mirror drive motor which rotates the projection mirror 12 via a transmission mechanism (not shown); and reference numeral 37, a focus motor which rotates a focusing mechanism via a transmission mechanism (not shown).

Providing the control section 301 with a fan state detecting section for detecting operating states of the cooling fans and a cooling fan control section, both being described later, makes it possible, based on the mode of installation of the projecting apparatus detected according to the invention, to control the operation of the cooling fans. This eventually makes it possible to efficiently cool such parts as the light source unit, lamp bulb (discharge lamp), and optical unit.

The control section 301 is, for example, a microcomputer. The control section 301 and constituent parts of the projecting apparatus are mutually accessible via a data bus.

The posture sensor 302 is, for example, an optical detection sensor capable of high-accuracy detection in four directions, i.e. upward, downward, leftward, and rightward. The RPI-1030 made by ROHM CO., LTD. is an example of such a sensor.

In the following, operation of the projecting apparatus of the invention will be described with reference to FIGS. 8, 5, and FIGS. 6A to 6D.

It is assumed that the user operates the projecting apparatus 10 using a remote controller (not shown) to transmit operation signals to an infrared reception part (not shown) of the projecting apparatus 10. Alternatively, the user may use the operation buttons 20 instead of the remote controller.

When, responding to a user operation, activating the projecting apparatus that has been inactive, the fans are started, the lamp of the light source section is lit, and the mirror drive motor 35 is driven causing the projection mirror 12 that has been closed in the projecting apparatus to be opened.

When the projecting apparatus 10 is in an operable state, the opening 22 is exposed so that the image projection light outputted from the image projection light output opening is emitted to the reflecting surface 13 of the projection mirror 12. Namely, the projection mirror 12 is opened (raised) to its regular operational position (to a predetermined angle) and fixed there so that the image projection light emitted to the reflecting surface 13 is reflected from the free curved reflecting surface to be projected on a projection surface, for example, an external screen.

To control the driving of the mirror drive motor 35, the mirror reverse rotation control section 31-4 and the mirror forward rotation control section 31-5 included in the control section 301 output control signals to the mirror motor driver 305. Namely, the mirror drive motor 35 is controlled to run forwardly or reversely or to stop using the control signal Mrev outputted from the mirror reverse rotation control section (M-Rev) 31-4 and the control signal Mfor outputted from the mirror forward rotation control section (M-For) 31-5.

The raising (opening) of the projection mirror 12 is carried out in conjunction with the turning on (lighting) of the light source lamp and the starting of the fans in the projecting apparatus 10.

Referring to FIG. 8, the control section 301 determines, based on the data detected by the posture sensor 302 and inputted to the installation mode (i) detecting section 31-1 and the installation mode (ii) detecting section 31-2, in which one of the installation modes shown in FIG. 6 the projecting apparatus 10 is installed. The control section 301 then controls the cooling fans based on the mode of installation of the projecting apparatus 10 thus determined.

How the cooling air passes through the housing 11 will be described below with reference to FIGS. 9 to 11.

Figure 9:
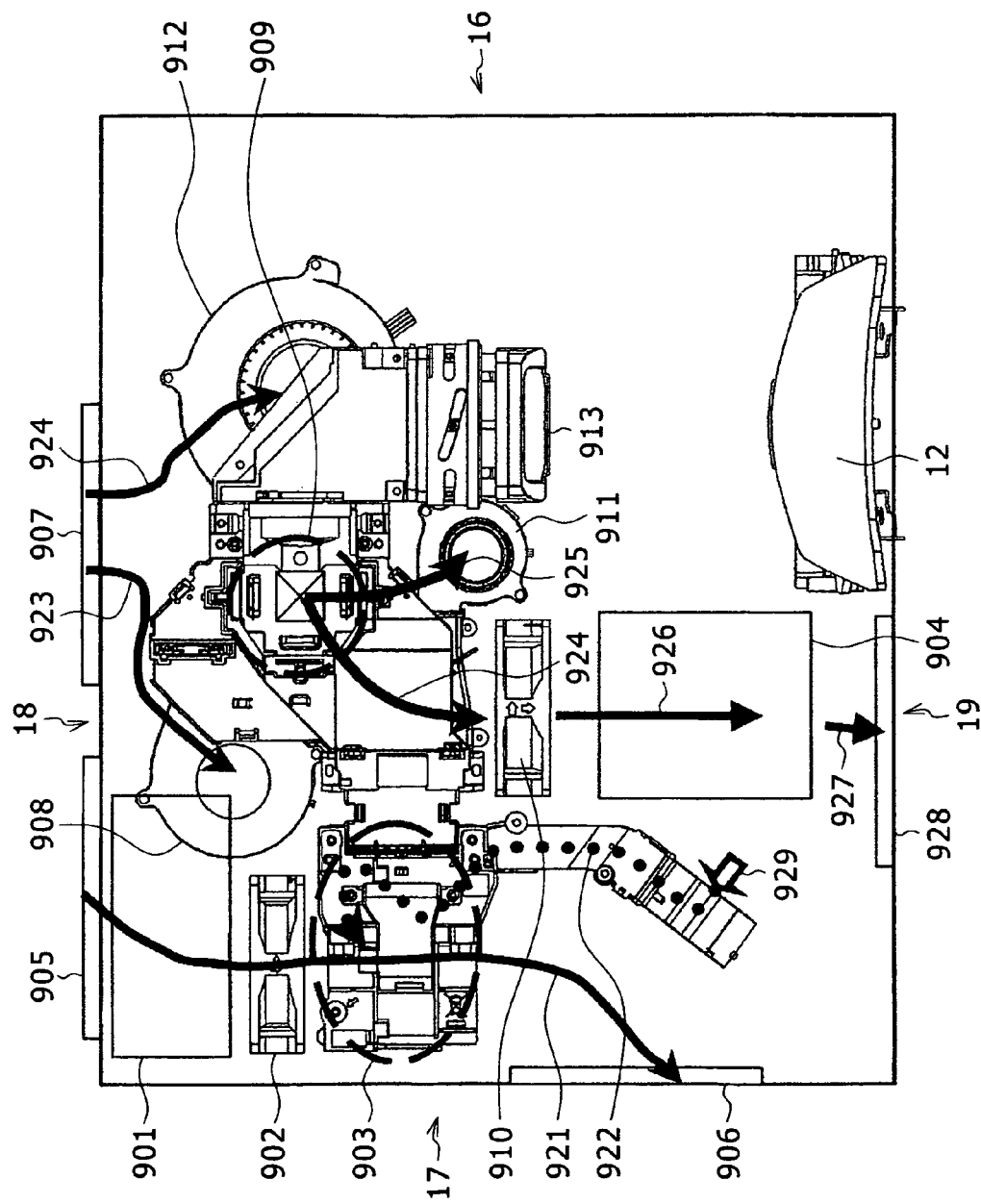
FIG. 9 is an explanatory diagram showing an embodiment which cooling air flows passing through the projecting apparatus according to the embodiment of the invention.

FIG. 9 shows the housing 11 as seen from above of the projecting apparatus 10 of the present invention. In FIG. 9, the top portion of the housing 11 is rendered transparent for the convenience of describing its interior, and constituent parts having no relevance to the following description are omitted.

In FIG. 9, the arrangement as seen from above of the cooling fans and parts to be cooled is shown. FIG. 10 shows the arrangement of the cooling fans and parts to be cooled as seen diagonally from behind the housing 11 (i.e. showing an interior portion of the housing 11 as seen from right to left in FIG. 4, the interior portion being in an inner corner portion bounded by the intake section 18 and the panel section 16 of the housing 11) (not showing the whole interior of the housing 11). FIG. 11 shows the arrangement of the cooling fans and parts to be cooled as seen from the front of the housing 11 (as seen in the same direction as the direction in which the projecting apparatus 10 is perspectively shown in FIG. 4).

Unless otherwise stated, the directions upper, lower, left, and right as mentioned in the following description are based on the assumption that the housing 11 or projecting apparatus has been installed in the surface installation mode for forward projection (see FIG. 6A).

Also, in the drawings referred to in the following description, the positions of the projection mirror 12 and the output lens 423 are not necessarily accurately shown. They only show an approximate arrangement.

Figure 10:
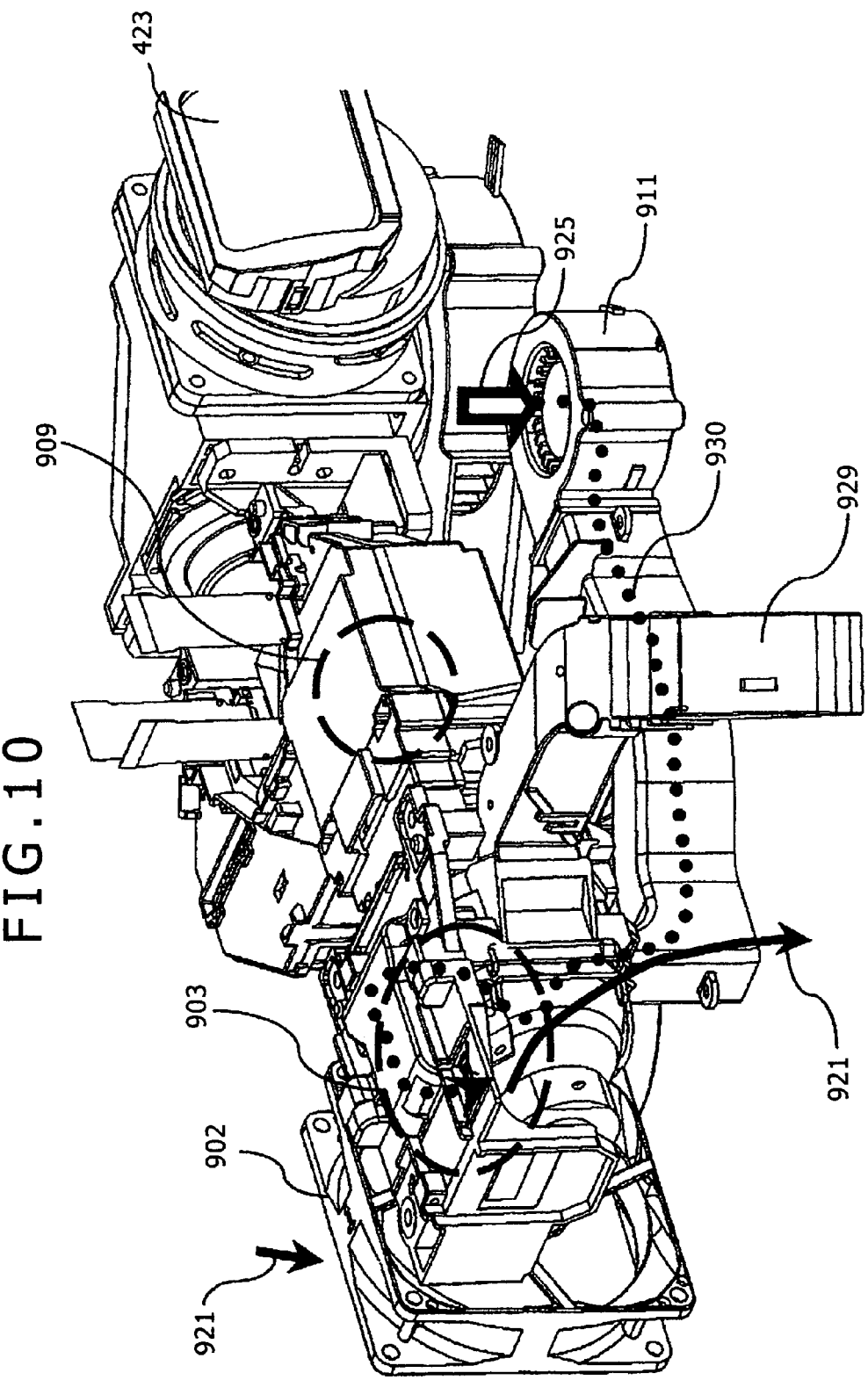
FIG. 10 is an explanatory diagram showing an embodiment which cooling air flows passing through the projecting apparatus according to the embodiment of the invention.

Referring to FIGS. 9 to 11, cooling air 921 taken in by the sucking force of an axial-flow lamp fan 902 via an air inlet 905 for ballast power supply and lamp passes through a lamp power supply section 901 and the axial-flow lamp fan 902 and enters a light source unit 903. The cooling air 921 then flows through the light source unit 903 as shown by arrows in FIGS. 2A and 2B or in FIGS. 3A and 3B depending on the installation mode of the projecting apparatus. When the projecting apparatus is installed on a flat surface for downward projection (see FIG. 6C), the cooling air 921 flows out of the projecting apparatus via an air outlet 906 as shown by the corresponding arrowed solid line in FIG. 9, thereby releasing the heat carried by it outside the projecting apparatus. When the projecting apparatus is installed on a flat surface for forward projection (see FIG. 6A) or suspended from the ceiling for forward projection (see FIG. 6B), the cooling air 921 flows out of the projecting apparatus via the air outlet 906 as shown by a dotted line 922 in FIG. 9, thereby releasing the heat carried by it outside the projecting apparatus.

Cooling air taken in by the sucking forces of sirocco fans 908 and 912 via an air inlet 907 flows in the projecting apparatus forming two cooling air flows 923 and 924.

The cooling air flow 923 sucked in by the sirocco fan 908 flows out of a fan exit provided in a lower portion of the sirocco fan 908 and further flows as a cooling air flow 923' (see FIGS. 9, 10 and 11) to cool a liquid crystal panel periphery 909. The position of the liquid crystal panel periphery 909 shown in FIGS. 10 and 11 is inaccurate. FIG. 9 indicates the correct position of the liquid crystal panel periphery 909. The cooling air then flows upward and is divided into the cooling air flow 924 to be sucked in by a fan 910 and a cooling air flow 925 to be sucked in by a sirocco fan 911. The cooling air flow 924 passes the fan 910 to become a cooling air flow 926 (see FIG. 9). The cooling air flow 926 subsequently passes a circuit power supply section 904, then as a cooling air flow 927 having rendered cooling effects inside the projecting apparatus flows out of the projecting apparatus via an air outlet 928, thereby releasing the heat carried by it outside the projecting apparatus.

In cases where the projecting apparatus is installed on a flat surface for downward projection (see FIG. 6C), the cooling air flow 925 flows from the sirocco fan 911 as indicated by a dotted line 930 in FIG. 10 to cool a light source unit 903 and it then joins the cooling air flow 921. The cooling air flow 925 Joined the cooling air flow 921 subsequently flows out of the projecting apparatus via the air outlet 906 (see FIG. 9), thereby releasing the heat carried by it outside the projecting apparatus.

In cases where the projecting apparatus is installed on a flat surface for forward projection (see FIG. 6A) or suspended from the ceiling for forward projection (see FIG. 6B), the cooling air flow 924 is sucked by a sirocco fan 929 and cools, as a cooling air flow 922, the light source unit 903 and it then joins the cooling air flow 921. The cooling air flow subsequently flows out of the projecting apparatus via the air outlet 906, thereby releasing the heat carried by it outside the projecting apparatus.

Even though, in the above description made with reference to FIGS. 9 to 11, how various fans including sirocco fans are controlled is not specifically described, such internal parts as the light source unit, lamp bulb, and circuit power supplies of the projecting apparatus of the invention can be maintained at appropriate temperature by detecting, using a sensor under the control of the control section 301, the mode of installation of the projecting apparatus and adjusting fan rotation speeds and torques according to the detected mode of installation of the projecting apparatus.

In the projecting apparatus, hot air (cooling air) flows differently according to the mode of installation of the projecting apparatus, so that fans which suck cooling air into where cooling air is not required may be kept rotating only at a speed not so high as to generate an undesired negative pressure while allowing fans, which are required to create cooling air flows, to be kept rotating powerfully. In this way, the internal parts including the light source unit and discharge lamp (lamp unit) of the projecting apparatus can be efficiently kept at appropriate temperature.

Thus, it is possible to maintain the lamp bulb at appropriate temperature to extend the life of the light source whether the projecting apparatus is installed on a flat surface for forward projection or for downward projection or suspended from the ceiling for forward projection or for upward projection. Also, since fans which are not required to create a cooling air flow are kept rotating only at speed not so high as to generate an undesired negative pressure, power consumption and noise generation can be reduced.

Even though, the projecting apparatus used in the above embodiment projects an image on an external projection surface by having output projection light reflected from a projection mirror having a reflecting surface, the present invention can also be applied to other types of projecting apparatuses.

What is claimed is:

1. A projecting apparatus which projects an image for display using a discharge lamp as a light source, comprising:
   an air inlet for taking in a cooling medium for cooling the projecting apparatus,
   an air outlet for exhausting the cooling medium for cooling the projecting apparatus,
   a plurality of fans which each let the cooling medium flow in a predetermined direction, and
   a control section which controls the plurality of fans according to a position detected by a position sensor,
   wherein the control section determines which fan of the plurality of fans is to operate, based on the position detected by the position sensor based on an installation mode of the projecting apparatus including an installation mode for a downward projection and an installation mode for an upward projection.

2. The projecting apparatus according to claim 1, further comprising a lamp duct provided on a side thereof, the side being close to a lamp door section provided for use in replacing the discharge lamp,
   wherein the cooling medium cools, after cooling the discharge lamp, a lamp reflector disposed rearward of the discharge lamp.

3. The projecting apparatus according to claim 1, wherein the control section controls, according to the position detected by the position sensor, the plurality of fans such that torques of some of the plurality of fans are not so high as to generate a negative pressure.

4. The projecting apparatus according to claim 2, wherein the control section controls, according to the position detected by the position sensor, the plurality of fans such that torques of some of the plurality of fans are not so high as to generate a negative pressure.

5. The projecting apparatus according to claim 1, wherein the discharge lamp comprises a lamp bulb and a lamp reflector, and the air inlet comprises a first air inlet to cool the lamp bulb and a second air inlet to cool the lamp reflector.

6. The projecting apparatus according to claim 5, wherein the control section controls the plurality of fans to have a first air flow corresponding to the installation mode of the projecting apparatus for the downward projection and a second air flow corresponding to the installation mode of the projecting apparatus for the upward projection.

7. The projecting apparatus according to claim 1, wherein the installation mode of the projecting apparatus for the downward projection is a surface installation mode.

8. The projecting apparatus according to claim 1, wherein the installation mode of the projecting apparatus for the upward projection is a suspended installation mode.

* * * * *